(12) United States Patent
Todd

(10) Patent No.: US 11,897,801 B2
(45) Date of Patent: Feb. 13, 2024

(54) SILICA SCALE INHIBITORS

(71) Applicant: SOLENIS TECHNOLOGIES, L.P., Wilmington, DE (US)

(72) Inventor: Michael A. Todd, Wilmington, DE (US)

(73) Assignee: Solenis Technologies, L.P., Wilmington, DE (US)

( * ) Notice: Subject to any disclaimer, the term of this patent is extended or adjusted under 35 U.S.C. 154(b) by 317 days.

(21) Appl. No.: 16/940,498

(22) Filed: Jul. 28, 2020

(65) Prior Publication Data

US 2021/0032141 A1 Feb. 4, 2021

Related U.S. Application Data

(60) Provisional application No. 62/880,172, filed on Jul. 30, 2019.

(51) Int. Cl.
| | |
|---|---|
| *C02F 5/12* | (2023.01) |
| *C08L 71/02* | (2006.01) |
| *C02F 1/00* | (2023.01) |
| *C02F 103/10* | (2006.01) |

(52) U.S. Cl.
CPC .............. *C02F 5/12* (2013.01); *C08L 71/02* (2013.01); *C02F 1/00* (2013.01); *C02F 2103/10* (2013.01)

(58) Field of Classification Search
None
See application file for complete search history.

(56) References Cited

U.S. PATENT DOCUMENTS

| | | | |
|---|---|---|---|
| 3,951,827 A | 4/1976 | Burroughs et al. | |
| 4,476,930 A | 10/1984 | Watanabe | |
| 4,532,047 A | 7/1985 | Dubin | |
| 5,271,847 A | 12/1993 | Chen et al. | |
| 5,435,969 A | 7/1995 | Hoots et al. | |
| 5,858,245 A | 1/1999 | Gallup | |
| 6,166,149 A | 12/2000 | Yamaguchi et al. | |
| 6,641,754 B2 | 11/2003 | Buentello et al. | |
| 7,316,787 B2 * | 1/2008 | Hendel ..................... | C02F 5/10 210/698 |
| 8,927,654 B2 * | 1/2015 | Nishida ................... | C23F 14/02 210/698 |
| 10,118,848 B2 | 11/2018 | Mehta et al. | |
| 2006/0060816 A1 | 3/2006 | Hendel et al. | |
| 2007/0105744 A1 | 5/2007 | Amiconi | |
| 2008/0011687 A1 | 1/2008 | Campo et al. | |

(Continued)

FOREIGN PATENT DOCUMENTS

| | | |
|---|---|---|
| CN | 1231996 A | 10/1999 |
| CN | 101244870 A | 8/2008 |

(Continued)

OTHER PUBLICATIONS

Machine translation of KR100956169B1, pp. 1-4, 2010.*

(Continued)

*Primary Examiner* — Clare M Perrin
(74) *Attorney, Agent, or Firm* — Lorenz & Kopf, LLP

(57) ABSTRACT

Industrial water such as in a geothermal unit is stabilized against silica polymerization and flocculation by using a combination of inhibitors including a nonionic polyether and a monomeric polycarboxylate.

20 Claims, 11 Drawing Sheets

Metal Silicate → Silica Polymerization and Growth → Metal Silicate Core Amorphous Silica Shell

(56) References Cited

U.S. PATENT DOCUMENTS

| | | | |
|---|---|---|---|
| 2008/0108539 A1* | 5/2008 | Kany | C11D 1/78 |
| | | | 510/401 |
| 2011/0049052 A1 | 3/2011 | Hirsch et al. | |
| 2011/0114564 A1 | 5/2011 | Amjad et al. | |
| 2012/0260938 A1 | 10/2012 | Zack et al. | |
| 2014/0083949 A1* | 3/2014 | Takahashi | C02F 1/20 |
| | | | 210/96.1 |
| 2015/0076074 A1 | 3/2015 | Mehta et al. | |

FOREIGN PATENT DOCUMENTS

| | | |
|---|---|---|
| CN | 106673216 A | 5/2017 |
| EA | 014113 B1 | 10/2010 |
| JP | H0231894 A | 2/1990 |
| JP | 2014036912 A | 2/2014 |
| KR | 100956169 B1 * | 5/2010 |
| KR | 100956169 B1 | 5/2010 |
| RU | 2128628 C1 | 4/1999 |
| WO | 2016033259 A1 | 3/2016 |
| WO | 2019232019 A | 12/2019 |

OTHER PUBLICATIONS

Topcu, G. et al., "Increasing solubility of metal silicates by mixed polymeric antiscalants", Geothermics (2019), 106-114.

Killmann, E. et al. "Coagulation and Flocculation Measurements by Photon Correlation Spectroscopy—Colloidal SiO2 Bare and Covered by Polyethylene Oxide", Colloid Polym Sci. 273:1071-1079 (1995).

ISA/US, International Search Report and Written Opinion issued in Int. Appl. No. PCT/US2020/043962 dated Oct. 20, 2020.

* cited by examiner

SILICA SCALE INHIBITORS

INTRODUCTION

Silica scale is a serious problem in many applications including for many geothermal power plants. Deposition of amorphous silica can occur when the temperature drops, causing the silica saturation level to decrease. Once formed, silica scale restricts the water flow and reduces the efficiency of heat exchangers and the reinjection capacity of reinjection wells. Further complicating things, silica can precipitate as either amorphous silica or as a metal silicate, such as magnesium silicate.

Silica is ubiquitous in geothermal water and other industrial process water. Silica becomes soluble when silica-containing rock contacts hot geothermal water. As the temperature increases so does the solubility of silica (Zuhl and Amjad, 2014). Some silica dissolves in the hot reservoir water. Often, geothermal brine is at or near the silica saturation limit when it reaches the surface. When geothermal power plants extract heat from the brine, the temperature drops, leading to lower silica saturation limits. When the silica saturation limit drops below the silica concentration, silica scaling can occur. Often, scale forms in steam separators and heat exchangers, leading to restricted flow and reduced energy extraction. Scale negatively influences the amount of electricity that can be produced and reduces the return on investment from geothermal power plants.

A need exists for a silica scale inhibitor that prevents silica polymerization and eliminates the formation of amorphous silica. Previous studies experienced mixed success with silica scale inhibitors (Gallup, 1993; Gallup, 1997; Gallup, 2002; Gallup and Barcelon, 2005; Garcia et al., 2001). While some efficacy was observed in the laboratory and in the field, most inhibitors did not completely inhibit amorphous silica scale. In fact, several inhibitors caused increased deposition in laboratory and field tests (Gallup, 2002; Gallup and Barcelon, 2005). Increased deposition has been observed even under non-geothermal conditions (Demadis and Neofotistou, 2007; Demadis et al., 2009; Mavredaki et al., 2005; Zhang et al., 2011; Zhang et al., 2012A; Zhang et al., 2012B). An amorphous silica scale inhibitor that prevents silica polymerization without causing precipitation or flocculation of silica colloids would be an advance.

SUMMARY

A variety of inhibitors were tested using the molybdate active silica test. The best inhibitors prevented the polymerization of silica at least four hours, even at low doses. Silica polymerization was minimized or prevented using as little as 10 ppm of inhibitor. Leading candidates were further tested in the presence of poisons such as aluminum. Several of the most effective inhibitors of amorphous silica polymerization were ineffective in the presence of aluminum. In various embodiments, the current teachings provide inhibitors that prevent amorphous silica scale in the presence of aluminum.

A method of inhibiting the formation of silica scale in an industrial water process comprises treating the water in the industrial process with an anti-scalant effective amount of a combination of two inhibitors, wherein a first inhibitor comprises a nonionic polyether and a second inhibitor comprises a monomeric polycarboxylate. The nonionic polyether can comprise a homopolymer of ethylene oxide, a homopolymer of propylene oxide, or a copolymer of ethylene oxide and propylene oxide, in non-limiting fashion. In various embodiments, the weight average molecular weight of the first inhibitor is about 1000 to about 20000 Dalton, about 2000 to about 15000 Dalton, or about 1000 to about 5000 Dalton.

In any of the embodiments herein, the second inhibitor comprises EDTA, pentetic acid, or other monomeric polycarboxylate, by way of example.

In any of the embodiments herein, the concentration of the first inhibitor in the treated water can be about 0.1 ppm to about 100 ppm, and the concentration of the second inhibitor in the treated water can be about 0.1 ppm to about 100 ppm.

In various embodiments, the treatment methods are carried out at temperatures of about 0° C. to about 200° C. The water in the industrial process further usually contains a detectable, non-zero amount of one or more of $Mg+2$, $Ca+2$, and $Al+3$. Silica content of the industrial process water in non-limiting examples ranges from about 20 to about 1000 ppm, about 100 ppm to about 500 ppm, or about 10 to about 10000 ppm.

In one embodiment, the first inhibitor is a polyethylene glycol and the second inhibitor is EDTA, and the industrial process is a geothermal system.

Industrial process water treated according to the current teachings is stabilized against silica polymerization and flocculation and contain water, silica, and optionally one or more of $Mg+2$, $Ca+2$, and $Al+3$, and further comprise stabilizing amounts of a first inhibitor and second inhibitor described herein. The first and second inhibitors maintain their anti-scalant effect even if the water contains ppm levels of aluminum in the form of $Al^{3+}$.

DESCRIPTION

Scale Inhibitors

Figure 1:
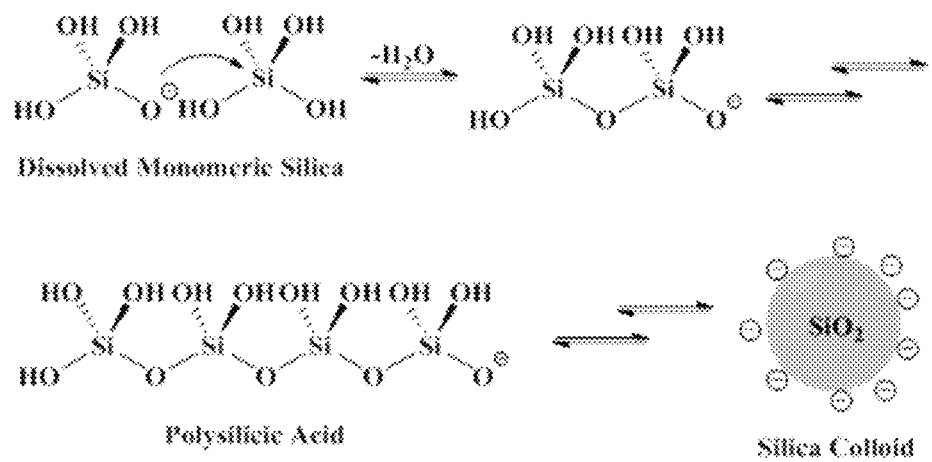
FIG. 1 is a cartoon illustrating polymerization of silica to polysilicic acid and eventual formation of colloidal silica.
Figure 2:
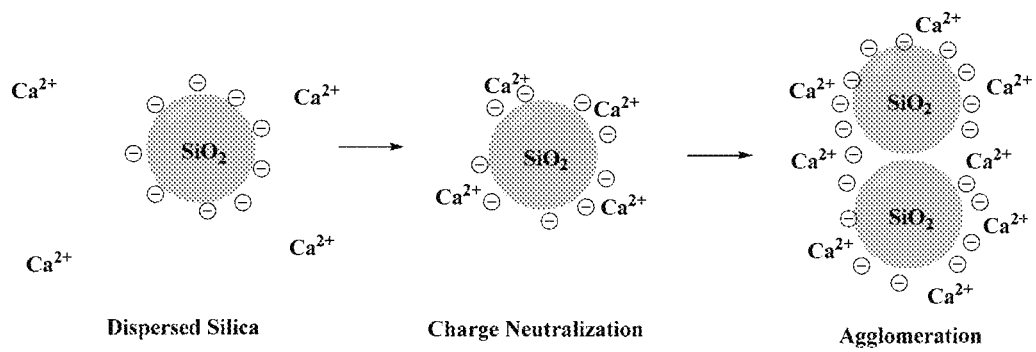
FIG. 2 is a cartoon illustrating charge neutralization and agglomeration of colloidal silica.

There are 2 types of silica scale inhibitors: 1) polymerization inhibitors, which prevent the polymerization of silica; and 2) dispersants, which bind to silica colloids and keep them from adhering to surfaces. Polymerization inhibitors include polyethylene imines, polyamidoamines, cationic polymers (e.g. poly(DADMAC)), cationic small molecules (e.g. Ethoquad® 18/25), Polyethylene oxide/polypropylene oxide (e.g. Pluronic® L-121). Dispersants include Acumer® 5000, Geogard® SX, Carbosperse® K-XP229, Ameroyal® 710.

Polymerization inhibitors tend to reduce the polymerization of silica. Unfortunately, they also tend to cause precipitation and flocculation of silica colloids. This can make scale formation worse. Dispersants do not prevent polymerization but can keep colloids suspended in solution. While they can be very effective under some conditions, dispersants tend to be poisoned by aluminum and iron. They can also cause increased scale under geothermal conditions.

The scale inhibitor described herein, being a combination of nonionic polyether and monomeric polycarboxylate, leads to reduced silica polymerization without precipitation and flocculation or with reduced levels of precipitation and flocculation. It prevents polymerization and precipitation to an acceptable extent, and the effect is advantageously obtained even when the water in the process contains 1 ppm or more of aluminum ion, which tends to reduce the effectiveness or "poison" prior art silica scale inhibitors. The combination is more efficacious than either inhibitor alone. In a non-limiting example, about 5 ppm PEG and about 10 ppm EDTA prevented silica polymerization and precipitation for 288 minutes at 60° C.

Industrial Water Processes

Silica scaling as discussed herein can arise wherever water is to be used in an industrial process and where the water naturally contains elevated levels of silica or becomes contaminated with silica during operation. In addition to geothermal systems for heat and power, processes for which silica scaling is a potential problem include cooling water, boiler water, potable water, industrial process water, mining, mineral processing and refining, oil and gas extraction, oil and gas refining, chemical processing, biorefining, pulp and paper water, influent/effluent water, food processing, reverse osmosis, gas scrubber systems, and evaporator systems, in non-limiting fashion.

The water in the industrial processes can take on a wide variety of temperatures, such as from about 0° (for example for cooling operations) up to 200° C. (for geothermal operations)

Water in industrial processes is treated by dosing with a combination of inhibitors either periodically (in batch) or constantly (continuous). In this way inhibitors can be injected, poured, pumped or otherwise provided into the process to provide a suitable level of the two inhibitors, which is referred to herein as aa anti-scalant effective amount It is also possible to withdraw aliquots from the process, add suitable amounts of inhibitor (perhaps at a concentration higher than the anti-scalant effective amount) to the aliquot and return the concentrated aliquot to the process to maintain an effective concentration of inhibitor in the system.

A brief discussion of the mechanism of silica scaling in these industrial processes follows.

Silica Scaling

Silica scaling is complicated and involves a number of different steps which have been discussed fully elsewhere (Bergna and Roberts, 2006). Briefly, polymerization of silicic acid, formation of silica colloids, colloid growth, precipitation and flocculation all are involved. Each of the steps is affected differently by temperature, pH and water chemistry. Together, the steps lead to a complex process in which silica can scale through four different mechanisms:

1. Silica polymerization, amorphous silica colloid formation and growth;
2. Charge neutralization/agglomeration of amorphous silica colloids;
3. Initiation of silica polymerization by metal silicates or hydroxides; and
4. Metal silicate formation Silica Polymerization, Amorphous Silica Colloid Formation and Growth The first mechanism of silica scale formation involves the polymerization of silica followed by colloid formation. Silicic acid initially dimerizes and then polymerizes to form polysilicic acid. Additional polymerization eventually leads to the formation of amorphous silica colloids. Temperature, pH, conductivity and a variety of anions and cations affect both the polymerization process and colloid formation (Weres et al., 1981; Amjad and Zuhl, 2010; Ngothai et al., 2012). These colloids continue to grow by reacting with silicic acid in solution, as shown in FIG. 1, as long as the concentration of silicic acid in solution exceeds the silica saturation limit. Commonly referred to as amorphous silica because they do not have a well-defined crystalline structure, these colloids are slightly negatively charged and, when small, are readily dispersed in water. This dispersion is the result of both electrostatic repulsion from the negative charge and steric repulsion from polysilicate chains on the surface of the colloid (Chen et al., 2018). As the colloids grow in size, however, these forces are no longer strong enough to keep the particles dispersed, leading to deposition (Bergna and Roberts, 2006). Given enough time, silica will polymerize until it reaches the silica saturation limit. This mechanism requires the silica concentration to be greater than the silica saturation limit.

Charge Neutralization/Agglomeration of Amorphous Silica Colloids

Another mechanism of deposition is charge neutralization and agglomeration. Negatively charged silica colloids can be neutralized by positively charged cations such as $Ca^{2+}$, $Mg^{2+}$, $Al^{3+}$, and $Fe^{2+/3+}$. Neutralization of the negative charge reduces the electrostatic repulsion between the colloids, thereby reducing the dispersibility of the colloids and leading to fine particles and possibly floc, which can deposit on surfaces (Iler, 1975; Nishida et al., 2009). In this mechanism, silica precipitates and flocculates more readily than amorphous silica alone. This mechanism requires the silica concentration to be greater than the saturation limit and high levels of di or trivalent cations to be available to neutralize the silica colloids.

Initiation of Silica Polymerization by Metal Silicates or Hydroxides

Silica polymerization can also be initiated by metal hydroxides or metal silicates. In this mechanism, a metal oxide, (M—O—) or silicate (Si—O—) functional group can initiate polymerization, thereby causing the growth of amorphous silica on either colloids suspended in solution or on surface deposits. Eventually, enough silica deposits such that the scale becomes mostly amorphous silica. Although the polymerization and colloid formation steps are identical to those of amorphous silica, the initiation step is different. Silica can polymerize below the silica saturation limit if polymerization is initiated by a metal silicate (Newton et al., 2018; Johnston et al., 2018). This mechanism requires the presence of a metal hydroxide or a metal silicate. Therefore, the concentration of the initiator (metal hydroxide or metal silicate) should exceed the solubility limit, which is influenced heavily by the pH and the metal concentration levels. The formation of iron, magnesium, calcium or aluminum silicates should be avoided to control this type of scale.

Metal Silicate Formation

The final mechanism is the formation of crystalline metal silicate. This mechanism does not involve amorphous silica or silica polymerization and has a well-defined crystalline structure. Metal silicates often have very different saturation levels than silica and are influenced heavily by the concentration of the metal cation, temperature and pH. Silicates of iron, magnesium and aluminum are common in geothermal systems (Inali and Atilla, 2011; Newton et al., 2018). These scales typically are controlled using either a dispersant or a crystal modifier (Gonzalez et al., 2003). The control of metal silicates is beyond the scope of this work, which focuses on the control of amorphous silica scale.

First Inhibitor—Nonionic Polyether

The first inhibitor is selected from nonionic polymeric compounds that include ether repeat units in the backbone. These arise for the most part from polymerizing alkylene oxides such as ethylene oxide and propylene oxide. The nonionic polyether can thus be understood to include a homopolymer of ethylene oxide (known as polyethylene glycol), a homopolymer of propylene oxide (known as polypropylene glycol) or a copolymer of ethylene oxide and propylene oxide, which polymer can be block (as in the famous Pluronic® polyols) or heteric (i.e., random).

Nonionic polyethers also include compounds that can be considered as derivatives of the homopolymer or copolymers discussed. These include ethoxylates or propoxylates (or the generic term alkoxylates) and can be synthesized by reacting an oxirane (ethylene oxide or propylene oxide, or a mixture of both) with an organic molecule that has an active hydrogen. Alternatively, they are synthesized by derivatizing an already formed alkylene oxide polymer, as in the case of esterifying a preformed polyalkylene oxide with, for example, a fatty acid.

These nonionic polyethers are well known and commercially available. Non-limiting examples include polyethylene glycol, polypropylene glycol, and copolymers of ethylene- and propylene glycol. Nonionic derivatives of PEG are exemplified by Mulsifan® 2000 MS (PEG 2000 monostearate), Tween® 80 (ethoxylated sorbitan monooleate), Ethomeen® O/12 (ethoxylated oleylamine), Pluronic F108 (14,600 MW block copolymer of approximately 70% ethylene oxide and 30% propylene oxide), Pluronic L-101 (3,800 MW block copolymer of approximately 12% ethylene oxide and 88% propylene oxide), Antarox L-121 (4,400 MW block copolymer of approximately 9% ethylene oxide and 91% propylene oxide), Pluronic 17 R2 (2,100 MW block copolymer of approximately 20% ethylene oxide and 80% propylene oxide), Tergitol 15-S-7 (Alcohols, C12-14-secondary, ethoxylated), Polyglycol PT4800 (4800 MW polymer of Glycerol, propylene oxide, ethylene oxide polymer), Tergitol 15-S-12 (Alcohols, C12-14-secondary, ethoxylated), Pluronic FT L61 (2000 MW block copolymer of approximately 10% ethylene oxide and 90% propylene oxide), polypropylene glycol 2000 (2000 MW polymer of propylene glycol), polypropylene glycol 4000 (4000 MW polymer of propylene glycol), and ethoxylated carbohydrates.

In various embodiments, the effectiveness of the nonionic polyether increases as the molecular weight increases. The molecular weight increases with the degree of ethoxylation or propoxylation. In various embodiments, the weight average molecular weight of the first inhibitor is about 1000 to about 20000 Dalton, about 2000 to about 15000 Dalton, or about 1000 to about 5000. For example, in the case of polyethylene glycol (PEG), there is evidence that the anti-scalant effectiveness is greater as the molecular weight reaches 1000 or 2000 and above. Thus, PEG 1000, PEG 2000, PEG 5000, PEG 8000, and PEG 9000 (where, as is conventional, the numbers in the name give the weight average molecular weight) are preferred inhibitors in some embodiments.

Second Inhibitor—Monomeric Polycarboxylate

The second inhibitor is a monomeric polycarboxylate. This term designates a non-polymeric organic molecule with more than one carboxyl group (COOH). In some embodiments, at least two of the carboxyl groups are attached either to a common atom (which is usually a carbon or nitrogen), or to adjacent atoms (which are usually both carbon atoms), or to atoms that are not adjacent but separated from one another by a third atom. Although the invention is not limited by theory, it is believed that the structure of the second inhibitor provides some level of chelation or coordination (with two or more carboxyl groups) that tends to stabilize the silica in solution in combination with the effect of the first inhibitor, where the first inhibitor is uncharged and the second inhibitor is negatively charged (as COO—) because of the pH. In various embodiments, the second inhibitor is free of phosphonate groups or other groups that would be anionic at the pH at which the inhibitors are applied.

Non-limiting examples of the second inhibitor include ethylenediaminetetraacetic acid (EDTA), diethylenetriaminepentaacetic acid, glutamic acid, aspartic acid, citric acid, methylglycine diacetate (BASF Trilon® M), Ethylenediamine-N,N'-disuccinic acid trisodium salt (EDDS), and nitrilotriacetic acid. In various embodiments, preferred inhibitors include EDTA and diethylenetriaminepentaacetic acid (the latter is also called pentetic acid). It is to be understood that salts of all of the second inhibitors can also be used.

The first and second inhibitors are added to the process water in order to achieve an anti-scalant concentration of the inhibitors in the process water. The level of inhibitors that gives suitable anti-scalant results can be determined empirically and is illustrated in the Examples below. In various embodiments, the inhibitors are present from about 0.1 to about 200 ppm, from about 1 to about 100 ppm, from about 5 ppm to about 100 ppm, or from about 10 ppm to about 100 ppm. The weight ratio of first to second inhibitor can also be found empirically; it is generally from about 1:10 to about 10:1 or from about 1:3 to about 3:1. In certain embodiments, the weight ratio is approximately 1:1.

Measurement of Inhibitor Effectiveness

Effectiveness of an inhibitor against silica polymerization is followed by measuring the concentration of silica (as SiO2) using known methods such as are described in the Examples below. When silica polymerizes, the measured concentration of silica is observed to decrease. Therefore, the lower the silica concentration, the higher the amount of polymerization. The concentration of silica can be followed and measured over time to quantify the effect of an inhibitor.

Similarly, precipitation or flocculation can be observed by measuring turbidity by known methods described in the Examples. The greater the development of turbidity over time there is in a sample, the less effective is the inhibitor exemplified in that sample.

In an aspect, the combination of inhibitors described here is effective to inhibit polymerization so that the concentration of SiO2 remains high (or higher than in the absence of the inhibitor) and also to inhibit flocculation so that the turbidity remains low (or lower than it would be without the inhibitor. And the combination has been found to be more effective than either inhibitor alone, even in the presence of amounts of aluminum that depress the effectiveness of prior art inhibitors.

Effect of pH

The inhibitors described herein work at a pH of around neutral, or at about pH 7. In various embodiments, the pH is maintained below 8.0, such as at pH 7.5 or lower. In certain embodiments, the pH is maintained at a level at which the carboxyl groups of the monomeric polycarboxylate are ionic.

EXAMPLES

Preparation of Stock Solutions

The silica stock solution was prepared by dissolving 5.68 g of sodium metasilicate nonahydrate in 94.32 g of deionized water. This solution was used within 1 hour of preparation and was remade daily. A stock solution of calcium/magnesium was prepared by dissolving 29.4 g of calcium chloride dihydrate and 40.7 g of magnesium chloride hexahydrate in 929.9 g of deionized water. Inhibitors were dissolved in water to make a 1% inhibitor solution by weight. Aluminum chloride hexahydrate was also dissolved in solution to make a 0.1% Al3+ solution by weight.

Polymerization Inhibition Tests

Ninety-two and one half grams of water were added to a 125 mL polyethylene bottle. One half g of 20% hydrochloric acid was added. This solution was placed on a shaker table, shaken at 200 rpm and heated to the desired temperature. After 45 minutes, the solution was removed. Four and three tenths mL of the silica stock solution was added, followed by 0.1 mL of the inhibitor stock solution and 2.5 mL of the calcium/magnesium stock solution. Optionally, 0.1 mL of a solution of 0.1% aluminum chloride as aluminum was added. The pH of this solution was approximately 3 and was adjusted to 7.0+/−0.1 using sodium hydroxide. When the pH was raised to 7.0 the time was recorded as t=0 minutes.

Silica polymerization was analyzed using a Hach™ DR3900 using the HR Silica test method. A 1 mL aliquot was added to 9 mL of deionized water in a 1-inch square sample cell from Hach. To this solution was added sodium molybdate followed by sulfamic acid. After 10 minutes, citric acid was added. After an additional 2 minutes, the concentration of silica was measured at 452 nm and was expressed as ppm as $SiO_2$. Readings were taken periodically to establish a time course for the polymerization of silica.

Turbidity Measurements

Turbidity was measured using a Hach™ 2100Q turbidimeter. Approximately 10 mL of sample was poured into a sample cell and measured immediately. Results are expressed as nephelometric turbidity units, NTU. Turbidity measurements were taken at the same time as silica polymerization measurements. An increase in turbidity indicated an increase in precipitation and/or flocculation.

TABLE 1

| Inhibitor | [SiO2] at 4 h (ppm) |
|---|---|
| No Inhibitor | 301 |
| 75 ppm PEG 400 | 324 |
| 75 ppm PEG 1000 | 362 |
| 75 ppm PEG 2000 | 623 |
| 75 ppm Turgitol XD | 575 |
| 75 ppm PEG 6000 | 583 |
| 75 ppm PEG 9000 | 564 |
| 75 ppm PEG 20000 | 568 |

Inhibitors were tested under the following conditions: $[SiO_2]$=550 ppm; $[Ca^{2+}]$=200 ppm; $[Mg^{2+}]$=122 ppm; pH=7.0; 40° C. Silica concentration was measured after 4 hours+/−0.5 hours.

Table 1 demonstrates the relationship of PEG chain length on the ability to inhibit silica polymerization. Below 2000 MW PEG provides little inhibition. At 2000 MW and above silica polymerization is inhibited.

TABLE 2

| Inhibitor | $[Al^{3+}]$ | [SiO2] at 4 h (ppm) |
|---|---|---|
| No Inhibitor | 0 ppm | 301 |
| 10 ppm PEG 9000 | 0 ppm | 550 |
| No Inhibitor | 1 ppm | 286 |
| 10 ppm PEG 9000 | 1 ppm | 352 |
| 10 ppm EDTA | 1 ppm | 393 |

Inhibitors were tested under the following conditions: [SiO2]=550 ppm; $[Ca^{2+}]$=200 ppm; $[Mg^{2+}]$=122 ppm; pH=7.0; 40° C. Silica concentration was measured after 4 hours+/−0.5 hours.

In the absence of aluminum 10 ppm PEG 9000 inhibits silica polymerization. When 1 ppm aluminum is added PEG 9000 becomes less effective at preventing silica polymerization. 10 ppm EDTA is also less effective at inhibiting silica polymerization.

TABLE 3

| Inhibitor | [SiO2] at 4 h (ppm) | Turbidity at 4 h (NTU) |
|---|---|---|
| No Inhibitor | 306 | 0.6 |
| 5 ppm PEG 9000 | 393 | 8.53 |
| 10 ppm EDTA | 393 | 0.61 |
| 5 ppm PEG 9000 + 10 ppm EDTA | 502 | 0.67 |
| 5 ppm PEG 9000 + 10 ppm Glutamic Acid | 471 | 7.46 |
| 5 ppm PEG 9000 + 10 ppm Ethylenediamine Disuccinic Acid | 417 | 4.73 |

TABLE 3-continued

| Inhibitor | [SiO2] at 4 h (ppm) | Turbidity at 4 h (NTU) |
|---|---|---|
| 5 ppm PEG 9000 + 10 ppm Aspartic Acid | 443 | 10.10 |
| 5 ppm PEG 9000 + 10 ppm Nitrilotriacetic Acid | 446 | 15.7 |
| 5 ppm PEG 9000 + 10 ppm Citric Acid | 434 | 19.1 |
| 5 ppm PEG 9000 + 10 ppm Pentetic Acid | 302 | 15.56 |

Inhibitors were tested under the following conditions: $[SiO_2]$=550 ppm; $[Ca^{2+}]$=200 ppm; $[Mg^{2+}]$=122 ppm; pH=7.0; 1 ppm $Al^{3+}$; 60° C. Silica concentration was measured after 4 hours+/−0.5 hours.

Table 3 shows that the combination of PEG and EDTA inhibits silica polymerization in the presence of $Al^{3+}$ while keeping the turbidity low. Other acids can be used in combination with PEG to inhibit silica polymerization. EDTA keeps the turbidity low.

TABLE 4

| Examples | Inhibitor | [SiO2] at 4 h (ppm) | Turbidity at 4 h (NTU) |
|---|---|---|---|
| Example 2 | 5 ppm PEG 9000 + 10 ppm EDTA | 502 | 0.67 |
| Example 11 | 5 ppm PEG 2000 + 10 ppm EDTA | 516 | 0.38 |
| Example 12 | 5 ppm PEG 400 + 10 ppm EDTA | 334 | 0.62 |
| Example 15 | 5 ppm Mulsifan 2000 MO + 10 ppm EDTA | 534 | 0.42 |
| Example 16 | 5 ppm Antarox L-121 + 10 ppm EDTA | 529 | 0.53 |
| Example 17 | 5 ppm Polyglycol P2000 + 10 ppm EDTA | 470 | 0.58 |
| Example 18 | 5 ppm Pluronic L-101 + 10 ppm EDTA | 486 | 3.72 |
| Example 19 | 5 ppm Pluronic F 108 + 10 ppm EDTA | 543 | 0.53 |
| Example 20 | 5 ppm Pluronic 17 R2 + 10 ppm EDTA | 532 | 0.55 |
| Example 21 | 5 ppm Tergitol 15-S-7 + 10 ppm EDTA | 531 | 0.41 |
| Example 22 | 5 ppm Polyglycol PT4800 + 10 ppm EDTA | 468 | 0.62 |
| Example 23 | 5 ppm Tergitol 15-S-12 + 10 ppm EDTA | 456 | 0.69 |
| Example 24 | 5 ppm Ethomeen O/12 + 10 ppm EDTA | 487 | 16.9 |
| Example 25 | 5 ppm Pluronic FT L61 + 10 ppm EDTA | 424 | 6.25 |
| Example 26 | 5 ppm Polypropylene Glycol 2000 + 10 ppm EDTA | 448 | 0.58 |
| Example 27 | 5 ppm Polypropylene Glycol 4000 + 10 ppm EDTA | 408 | 0.56 |
| Example 28 | 5 ppm PEG 6000 + 10 ppm EDTA | 476 | 4.6 |

Inhibitors were tested under the following conditions: $[SiO_2]$=550 ppm; $[Ca^{2+}]$=200 ppm; $[Mg^{2+}]$=122 ppm; pH=7.0; 1 ppm $Al^{3+}$; 60° C. Silica concentration was measured after 4 hours+/−0.5 hours.

Table 4 demonstrates that other derivatives of ethylene oxide and propylene oxide derivatives can be used in combination with EDTA in waters containing $Al^{3+}$. A minimum MW of 2000 g/mol was required for efficacy. PEG 400 provided little inhibition in combination with EDTA. Otherwise a broad range of EO/PO derivatives can be used in combination with EDTA.

TABLE 5

| pH | Inhibitor | [SiO2] at 4 h (ppm) | Turbidity at 4 h (NTU) |
|---|---|---|---|
| 6.0 | No Inhibitor | 552 | 1.04 |
| 6.0 | 5 ppm PEG 9000 + 10 ppm EDTA | 569 | 1.11 |
| 6.5 | No Inhibitor | 539 | 0.97 |
| 6.5 | 5 ppm PEG 9000 + 10 ppm EDTA | 554 | 1.67 |
| 7.5 | No Inhibitor | 343 | 1.04 |
| 7.5 | 5 ppm PEG 9000 + 10 ppm EDTA | 419 | 1.73 |
| 8.0 | No Inhibitor | 296 | 0.67 |
| 8.0 | 5 ppm PEG 9000 + 10 ppm EDTA | 325 | 0.95 |
| 8.5 | No Inhibitor | 295 | 0.81 |
| 8.5 | 5 ppm PEG 9000 + 10 ppm EDTA | 305 | 1.31 |
| 9.0 | No Inhibitor | 359 | 0.40 |
| 9.0 | 5 ppm PEG 9000 + 10 ppm EDTA | 300 | 1.09 |

Inhibitors were tested under the following conditions: $[SiO_2]$=550 ppm; 1 ppm $Al^{3+}$; 60° C. Silica concentration was measured after 4 hours+/−0.5 hours.

Table 5 shows the efficacy of the invention over a range of pH.

Example 2. Polymerization Inhibition Tests

The following inhibitors and potential inhibitors are discussed in this section:

| Inhibitor 1 | Flosperse ® 3024 | polymer of acrylic acid and 2-acrylamido-2-methanesulfonic acid |
|---|---|---|
| Inhibitor 2 | DETPMPA | Diethylenetriaminepentaphosphonic acid |
| Inhibitor 3 | Polystabil ® KWS-D | polycarboxylate polymer |
| Inhibitor 4 | Blend of a polyacrboxylate and phosphorate - Ameroyal 710 | |
| Inhibitor 5 | Carbosperse ® XP-229 | Polyoxyalkylene sodium salt |
| Inhibitor 6 | Copolymer of acrylic acid/polyethylene glycol allyl ether | |
| Inhibitor 7 | PEG 9000 | Polyethylene glycol (MW = 9000) |
| Inhibitor 8 | Hercules ® 973 | polyamidoamine from adipic acid and diethylenetriamine |
| Inhibitor 9 | Geogard ® SX | Phosphinocarboxylate polymer sold by BWA |
| Inhibitor 10 | Infinity ® 4335 | polycarboxylate polymer |
| Inhibitor 11 | EDTA | ethylenediamine tetraacetic acid |
| Inhibitor 12 | Pentetic Acid | diethylenetriaminepentaacetic acid |
| Inhibitor 13 | Polystabil ® W1A | polycarboxylate polymer |
| Inhibitor 14 | PASP | sodium polyaspartate |
| Inhibitor 15 | PESA | poly(epoxy succinic acid) |
| Inhibitor 16 | Acumer ® 3100 | Polycarboxylate polymer |
| Inhibitor 17 | DEHA | diethylhydroxylamine |
| Inhibitor 18 | HEDP | Hydroxyethylidenediphophonic acid |
| Inhibitor 19 | Isoascorbic acid | |
| Inhibitor 20 | Citric Acid | carboxylate chelant |

The concentration of silica was measured over time in order to investigate the efficacy of the silica polymerization inhibitors. The starting silica concentration was 550 ppm as SiO2. Successful inhibitors maintained a high silica reading throughout the experiment, while unsuccessful inhibitors allowed the silica level to drop over the course of the experiment.

Figure 4:
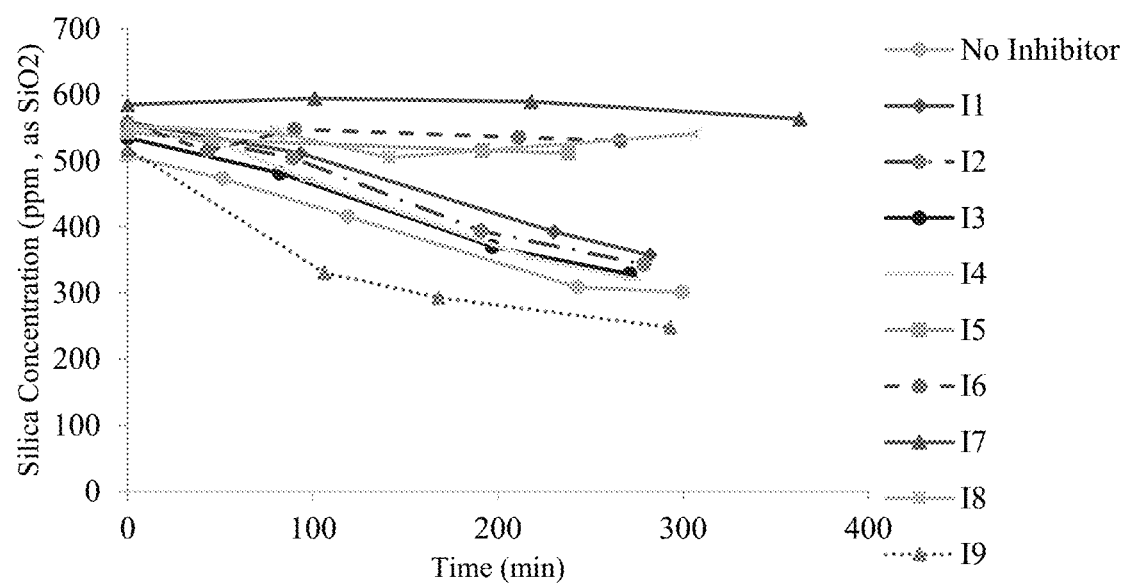
FIG. 4 is a graph showing silica inhibition by 75 ppm of inhibitor. Temperature=40° C., pH=7.0, 550 ppm silica as SiO2, 122 ppm Mg2+, 200 ppm Ca2+. Silica saturation index, SSI=3.6.

Polymers and small molecules were screened for polymerization inhibition at 40° C. for 4 hours, as shown in FIG. 4. These tests were run in the absence of aluminum. In the absence of inhibitor, the concentration of reactive silica dropped from more than 500 ppm to approximately 300 ppm as SiO2. Several inhibitors failed to inhibit polymerization and the decline in silica concentration was comparable to the control experiment. Inhibitor I9 appeared to increase the rate of silica polymerization. Four inhibitors successfully kept the reactive silica concentration above 500 ppm for the duration of the experiment. The most successful polymers were a nonionic polymer, I7; an amine based polymer, I8; and two carboxylated polymers, I5 and I6.

Figure 5:
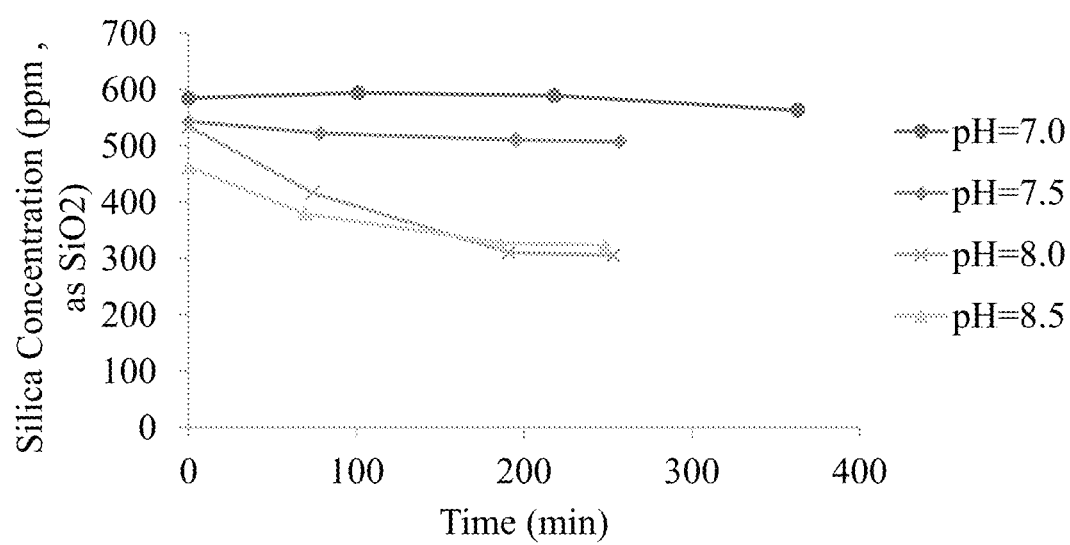
FIG. 5 is a graph showing the effect of pH on the efficacy of 10 ppm of I7. Temperature=40° C., pH=7.0, 550 ppm silica as SiO2, 122 ppm Mg2+, 200 ppm Ca2+. Silica saturation index, SSI=3.6.

The effect of pH on the efficacy of Inhibitor I7 was investigated. This inhibitor was dosed at 10 ppm at pH equals 7.0, 7.5, 8.0 and 8.5. At pH less than or equal to 7.5, this inhibitor inhibits silica polymerization, as shown in FIG. 5. When pH is raised to 8.0 or 8.5, Inhibitor I7 loses efficacy and silica rapidly polymerizes. Most likely this is due to the formation of magnesium silicate. Throughout these tests, when pH equals 7.5, the magnesium silicate saturation index is less than 1; however, when pH equals 8.0, the index rises to 5.5, as shown in Table 2. Based on these results, I7 works well at preventing amorphous silica formation but does not prevent magnesium silicate formation. Other products have been developed that do prevent the formation of calcium and magnesium silicate scale through dispersion (Gonzalez et al., 2003; Garcia and Mejorada, 2001).

Effect of Aluminum

Figure 6:
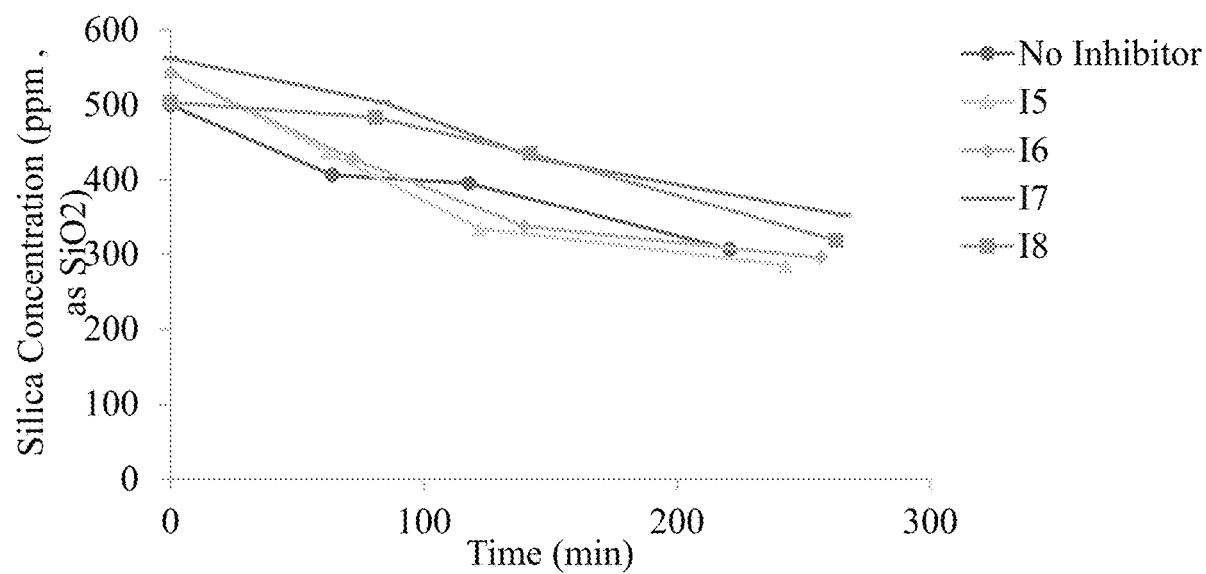
FIG. 6 is a graph showing the effect of aluminum on the efficacy of silica polymerization by 10 ppm of Inhibitors I5-I8. Temperature=40° C., pH=7.0, 550 ppm silica as SiO2, 122 ppm Mg2+, 200 ppm Ca2+, 1 ppm Al3+. Silica saturation index, SSI=3.6.
Figure 7:
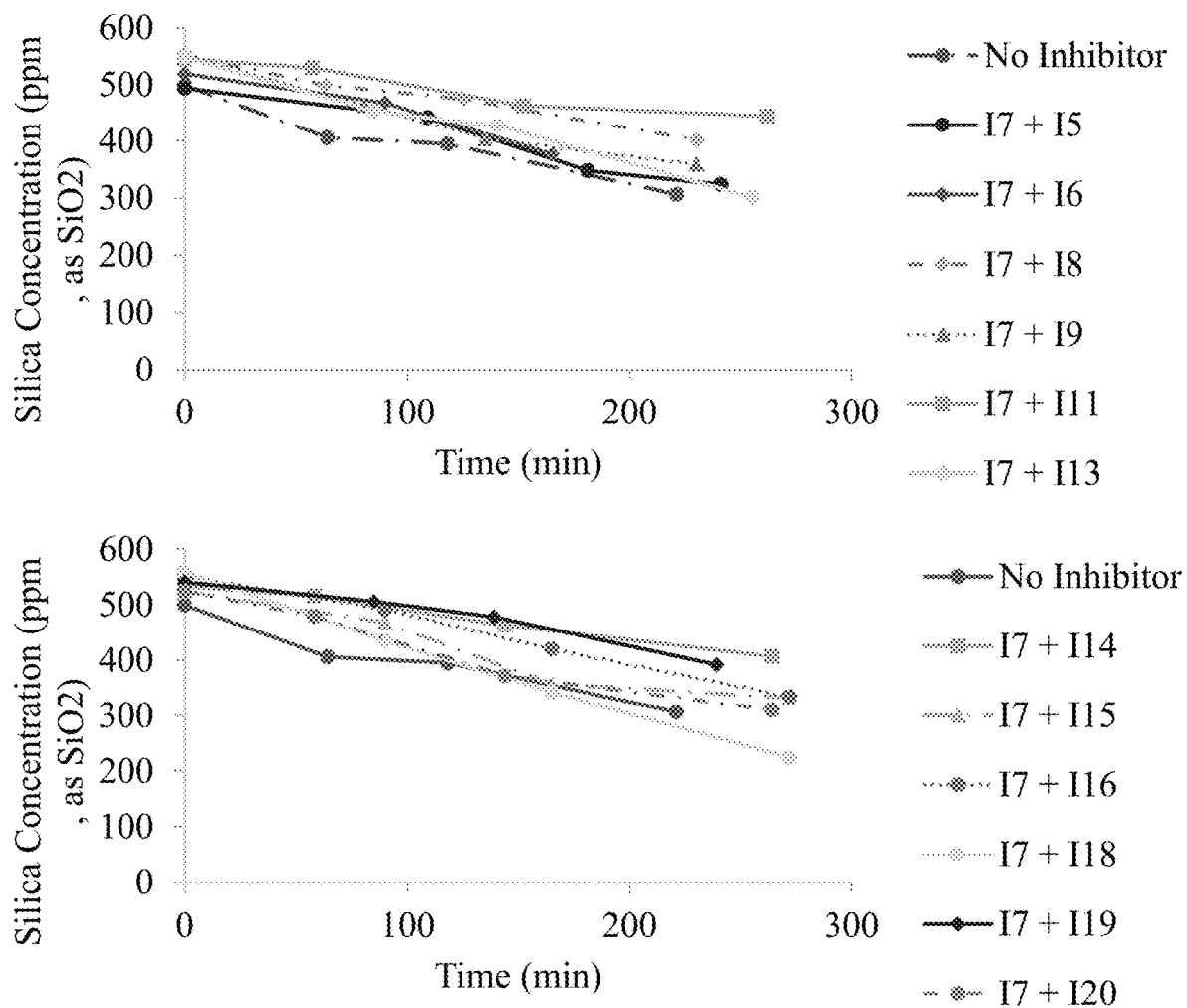
FIG. 7 is a graph showing efficacy of combinations of Inhibitor I7 with other inhibitors. All inhibitors were dosed at 10 ppm. Temperature=40° C., pH=7.0, 550 ppm silica as SiO2, 122 ppm Mg2+, 200 ppm Ca2+, 1 ppm Al3+. Silica saturation index, SSI=3.6.

The presence of 1 ppm of aluminum reduced the efficacy of these inhibitors to the point that they were able to reduce only slightly the rate of silica polymerization. Inhibitors, I5-I8, prevented silica polymerization in the absence of aluminum, as shown in FIG. 1, but failed to prevent silica polymerization in the presence of 1 ppm of aluminum, as shown in FIG. 6. Although the invention is not limited by any theory of action, two possible explanations exist for this behavior.

1. Inhibitors could be poisoned by Al3+, thereby reducing their efficacy. This effect has been noted before (Amjad and Zuhl, 2009). In this mechanism, aluminum interacts with the inhibitor and prevents it from interacting with the silica. The inhibitor thus becomes deactivated and efficacy is reduced.

Figure 3:
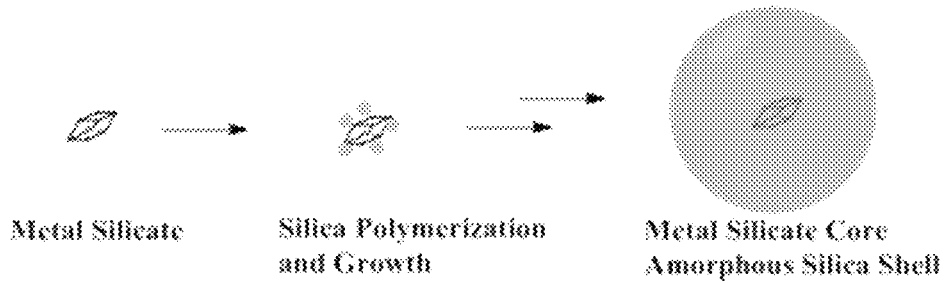
FIG. 3 is a cartoon illustrating silica growth on a metal silicate crystal.

2. Aluminum could be catalyzing or initiating silica polymerization. Aluminum can cause silica polymerization below the silica saturation limit (Newton et al., 2018). This is the mechanism shown in FIG. 3, where a metal silicate initiates silica polymerization. Polymers I5-I8 may be effective in preventing amorphous silica polymerization but ineffective at preventing polymerization caused by metal silicates.

It is unclear which of these mechanisms is operative under these conditions. Regardless, this is a serious issue because aluminum is present in many geothermal brines and is incorporated into many silica containing scales. Successful inhibitors should tolerate and mitigate the effects of aluminum.

Inhibitors I7 and I8 were tested in combination with other inhibitors to investigate any synergistic combinations. Inhibitor I7 was dosed at 10 ppm with 10 ppm of other inhibitors. In all cases, these combinations failed to prevent silica polymerization. The best results were obtained with the combination of I7 and inhibitors I11, I8, I14 or I19 in which silica polymerization was slowed but was not completely arrested. The combination of I7 and I11 was superior to the other combinations; however, even it still allowed approximately 100 ppm of silica to be polymerized over the course of the experiment. Inhibitors I5, I6, I9, I13, I15, I18 and I20 did not have a significant effect on the observed polymerization rate.

Figure 8:
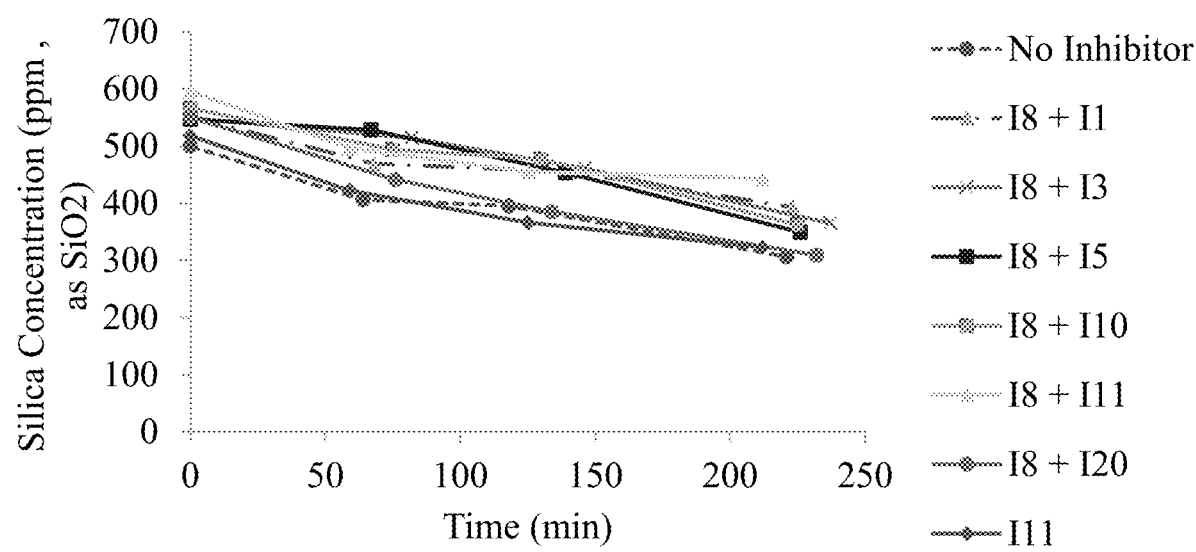
FIG. 8 is a graph showing the efficacy of combinations of Inhibitor I8 with other inhibitors. All inhibitors were dosed at 10 ppm. Temperature=40° C., pH=7.0, 550 ppm silica as SiO2, 122 ppm Mg2+, 200 ppm Ca2+, 1 ppm Al3+. Silica saturation index, SSI=3.6.

Inhibitor I8 was then tested in combination with other inhibitors. None of the combinations completely inhibited silica polymerization, as shown in FIG. 8. The most effective combination was with Inhibitors I8 and I11, which reduced the amount of polymerized silica by approximately 150 ppm over a 4 hour time period. At 10 ppm, I11 alone did not inhibit silica polymerization, as shown in FIG. 8. Inhibitor I11 appears to work synergistically with Inhibitors I7 and I8 to provide additional polymerization inhibition.

Figure 9:
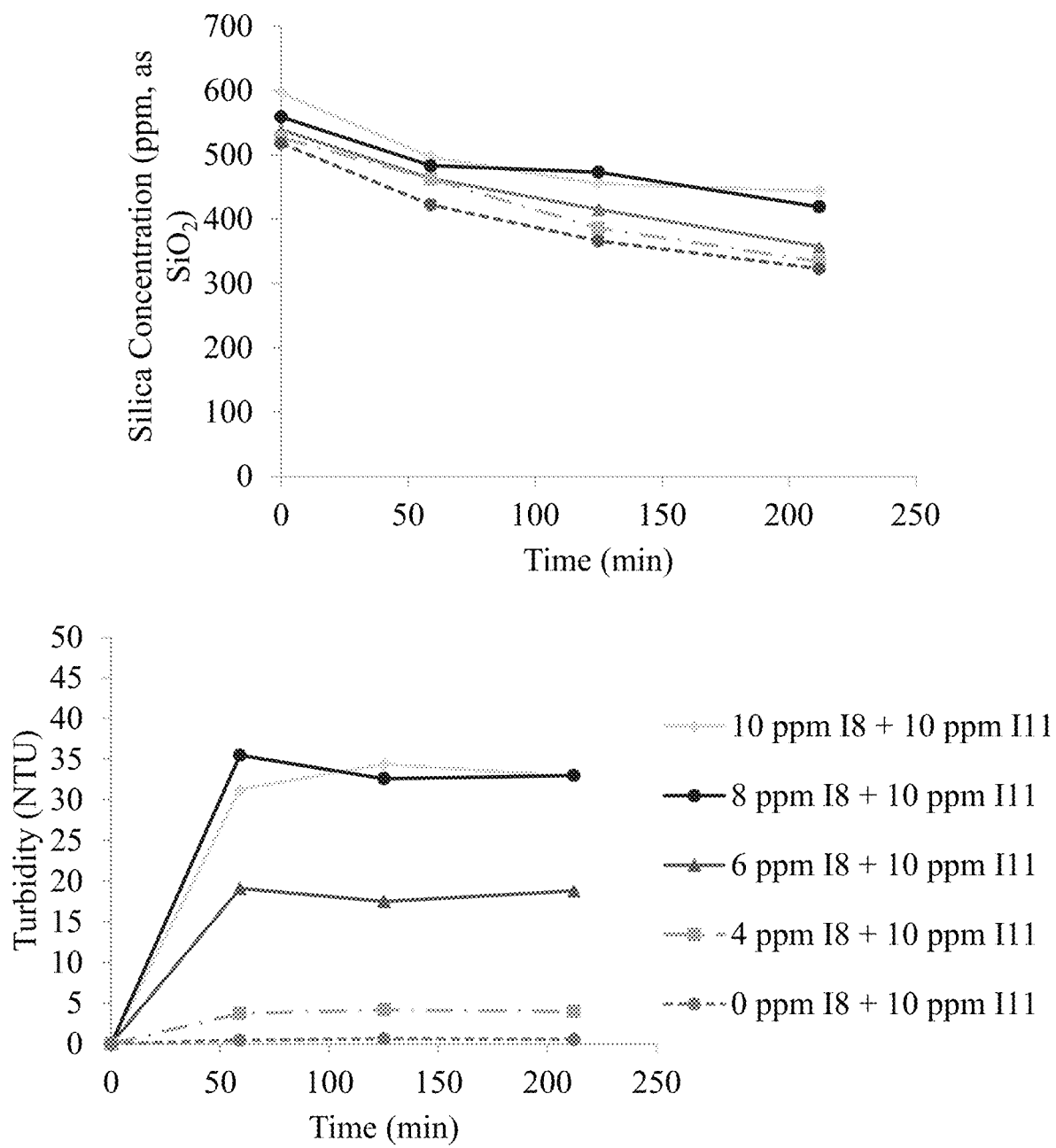
FIG. 9 is a graph showing the efficacy of combinations of Inhibitor I8 with other inhibitors. Temperature=40° C., pH=7.0, 550 ppm silica as SiO2, 122 ppm Mg2+, 200 ppm Ca2+, 1 ppm Al3+. Silica saturation index, SSI=3.6. Top: Silica polymerization. Bottom: Turbidity.

A dose response was run using Inhibitors I8 and I11, as shown in FIG. 9. The concentration of I11 was held constant at 10 ppm while the concentration of I8 was varied from 0 to 10 ppm. Both the silica concentration and turbidity were measured over time. Using 0 ppm of I8 and 10 ppm of I11, the silica polymerized but the turbidity stayed low. No signs of precipitation or flocculation were visible. Presumably, small silica polymers and colloids did form but remained small and well dispersed throughout the experiment. As the concentration of I8 was increased, the polymerization slowed but the turbidity increased. At 6 ppm of I8, the turbidity increased to 19 NTU and precipitation was visible. At 8 ppm and 10 ppm of I8, polymerization slowed even further, but the turbidity increased to 33 NTU. Precipitation and flocculation were both observed. These results suggest that while I8 can slow silica polymerization, it does not prevent it completely. Silica probably polymerizes to form polymers and small colloids. The inhibitor then causes the precipitation and flocculation of the colloids into visible precipitant and floc. Silica is known to disperse well without added inhibitor (Bergna and Roberts, 2006). This dispersability is a combination of electrostatic repulsion and steric repulsion from polysilicate chains on the colloid surface (Chen et al., 2018). Inhibitors can disrupt either the electrostatic repulsion through charge neutralization or the steric repulsion by interacting with the polysilicate chains on the colloid surface. Cationic inhibitors disrupt the dispersibility mainly through charge neutralization. Non-ionic and anionic inhibitors mainly affect dispersion by interacting with the polysilicate chains and disrupting the steric repulsion.

Tests at 60° C.; SSI=2.6

At a temperature of 40° C., the silica saturation index, SSI, was 3.6, which was quite aggressive. Raising the temperature to 60° C. lowers the SSI to 2.6, which was considerably less aggressive. Some of the tests were repeated at 60° C. under otherwise identical conditions. The water chemistry is detailed in Table 3.

TABLE 3

| Water Chemistry for Experiments at 60° C. | |
|---|---|
| Silica as $SiO_2$ | 550 ppm |
| $Ca^{2+}$ | 200 ppm |
| $Mg^{2+}$ | 122 ppm |
| $Al^{3+}$ | 1 ppm |
| pH | 7.0 |
| Temperature | 60° C. |
| Silica Saturation Index | 2.6 |

Figure 10:
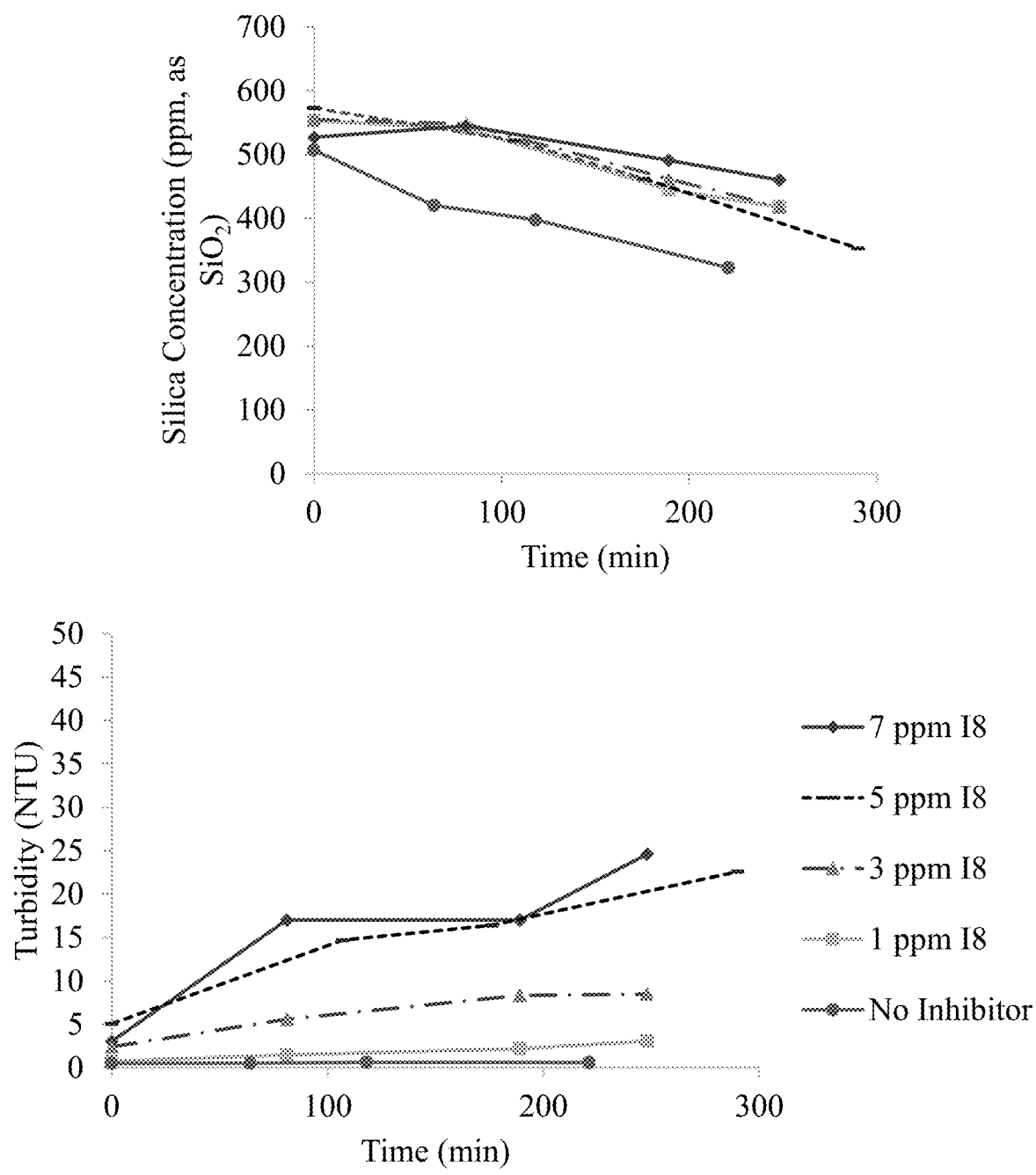
FIG. 10 is a graph showing dose response of I8. Temperature=60° C., pH=7.0, 550 ppm silica as SiO2, 122 ppm Mg2+, 200 ppm Ca2+, 1 ppm Al3+. Silica saturation index, SSI=2.6. Top: Silica polymerization inhibition. Bottom: Turbidity.
Figure 11:
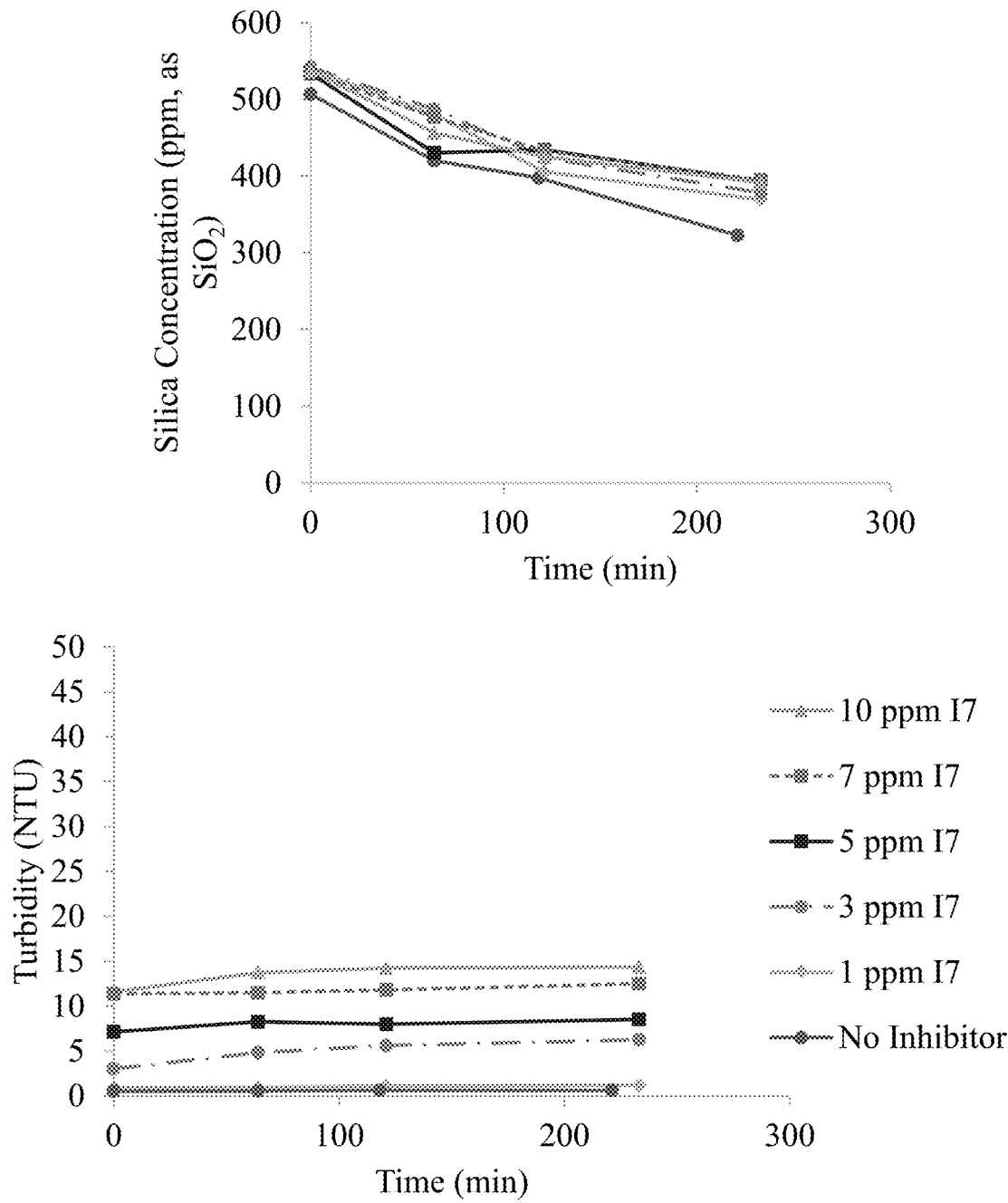
FIG. 11 is a graph showing dose response of I7. Temperature=60° C., pH=7.0, 550 ppm silica as SiO2, 122 ppm Mg2+, 200 ppm Ca2+, 1 ppm Al3+. Silica saturation index, SSI=2.6. Top: Silica polymerization inhibition. Bottom: Turbidity.

A dose response of Inhibitors I8 and I7 was run at a temperature of 60° C., as shown in FIGS. 10 and 11. Both inhibitors slowed but did not prevent silica polymerization. As expected, an increase in the inhibitor dose led to a reduction in silica polymerization. Unfortunately, increased doses also significantly increased the turbidity of the solution. At 1 ppm, neither inhibitor produced a significant amount of turbidity. At 7 ppm, both inhibitors caused a significant amount of precipitation and flocculation, which was quantified as increased turbidity. This effect was not the same for both inhibitors. Inhibitor I8 caused significantly more turbidity than I7 (25 NTU with 7 ppm I8 vs. 14 NTU with 7 ppm I7.) This effect is consistent with previous work by Gallup, who showed increased precipitation with increased doses of inhibitors (Gallup, 2002; Gallup and Barcelon, 2005).

Figure 12:
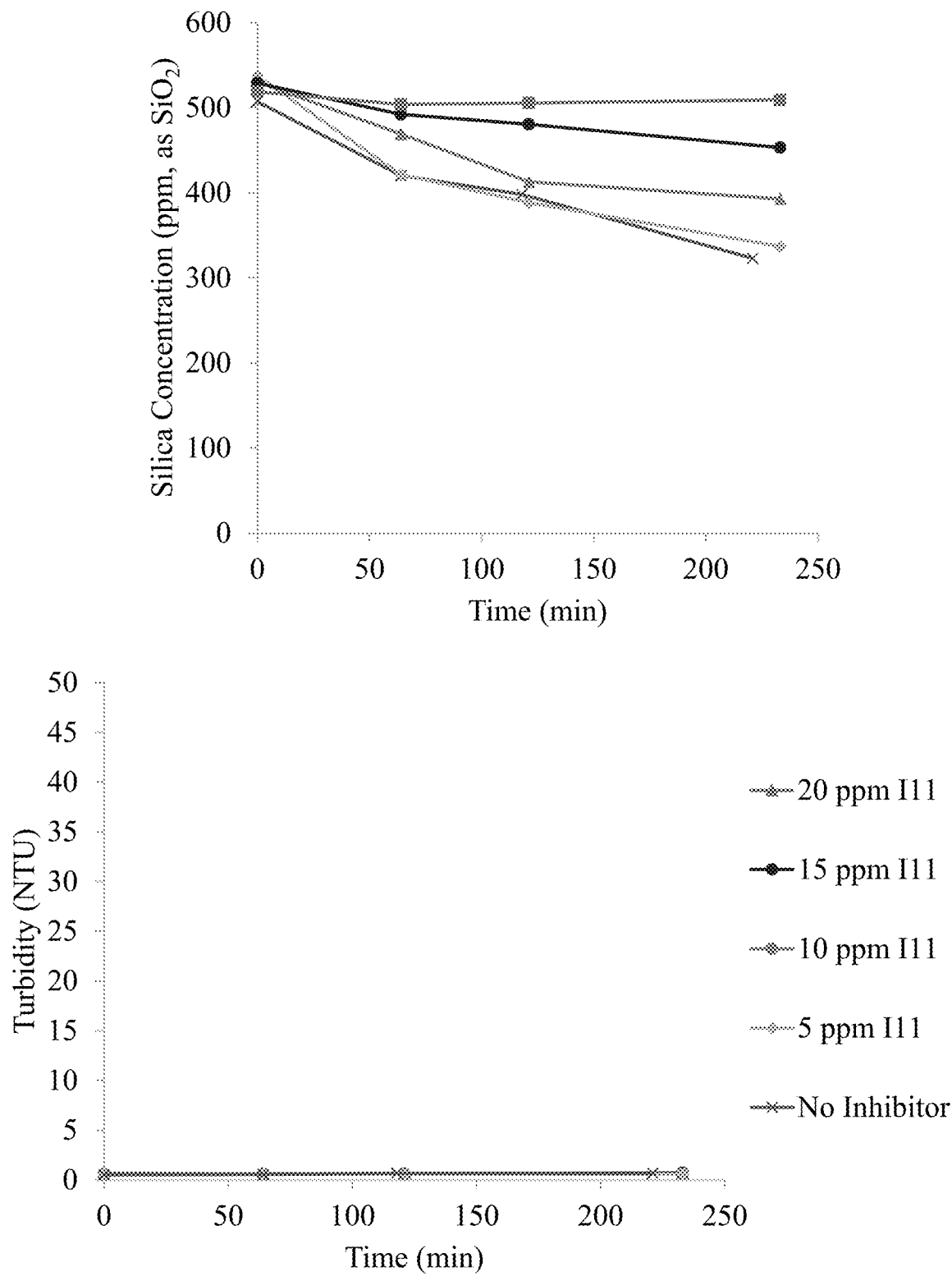
FIG. 12 is a graph showing dose response of I11. Temperature=60° C., pH=7.0, 550 ppm silica as SiO2, 122 ppm Mg2+, 200 ppm Ca2+, 1 ppm Al3+. Silica saturation index, SSI=2.6. Top: Silica polymerization inhibition. Bottom: Turbidity.
Figure 13:
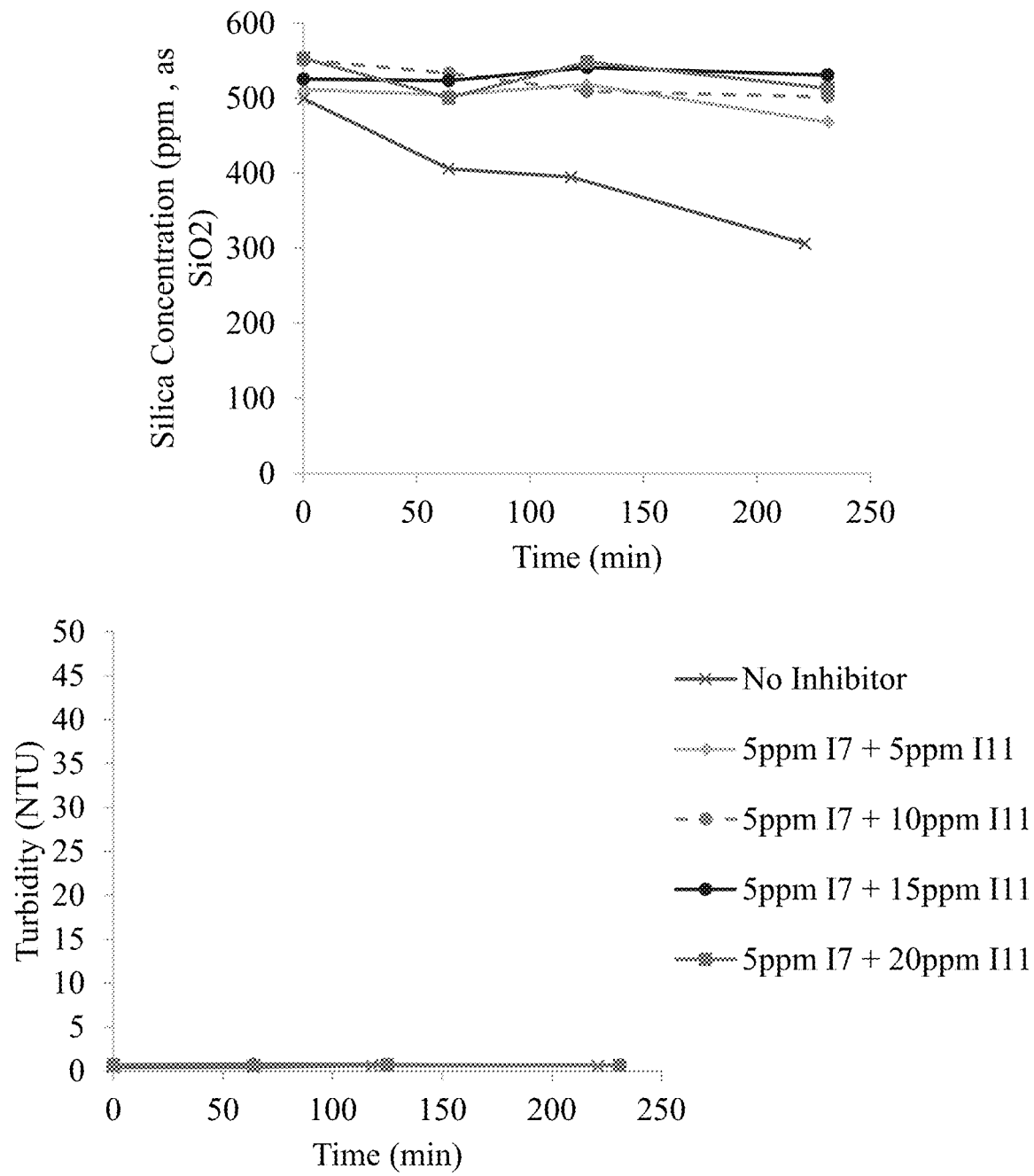
FIG. 13. Synergy between I7 and I11. Temperature=60° C., pH=7.0, 550 ppm silica as SiO2, 122 ppm Mg2+, 200 ppm Ca2+, 1 ppm Al3+. Silica saturation index, SSI=2.6. Top: Silica polymerization inhibition. Bottom: Turbidity.

A dose response of Inhibitor I11 from 5 to 20 ppm was also investigated. At 5, 10 and 15 ppm, I11 reduced but failed to prevent silica polymerization. At 20 ppm, however, I11 prevented silica polymerization, as shown in FIG. 12. The measured turbidity was less than 1 NTU for all doses. Inhibitor I11 was then tested in combination with I7, as shown in FIG. 13. The concentration of I7 was kept constant at 5 ppm while the concentration of I11 was varied between 5 and 20 ppm. The combination of these inhibitors prevented silica polymerization and precipitation at all concentrations. Even the combination of 5 ppm of I7 and 5 ppm of I11 prevented polymerization for more than 2 hours. No turbidity was observed in any of the experiments with the combination of I7 and I11. These results were very different from those observed with each inhibitor individually. Neither I7 nor I11 provided complete protection at either 5 or 10 ppm. Furthermore, I7 caused precipitation at both 5 and 10 ppm. The combination of I7 and I11, however, led to reduced silica polymerization without increased precipitation. The exact mechanism of the inhibition by this combination is under investigation.

Silica inhibitors were tested at temperatures of 40 (SSI=3.6) and 60° C. (SSI=2.6) in the presence of aluminum. Although some inhibitors prevented polymerization, precipitation was observed and quantified using turbidity measurements. These inhibitors did not fully prevent the polymerization of silica and caused the precipitation and flocculation of colloids that formed. The inhibitors may disrupt the electrostatic or steric repulsion of the silica colloids, thus causing coagulation and flocculation. A combination of Inhibitors I7 and I11 prevented both polymerization and precipitation of silica at 60° C.

REFERENCES

Amjad, Z. and Zuhl, R. W.: Silica Control in Industrial Water Systems with a New Polymeric Dispersant. Association of Water Technologies, Inc. Annual Convention & Exposition, The Westin Diplomat, Hollywood, Fl (2009).

Amjad, Z. and Zuhl, R. W.: The Role of Water Chemistry on Preventing Silica Fouling in Industrial Water Systems. Corrosion/2010 Conference and Exhibition, Houston, TX (2010).

Amjad, Z.: Silica Scale Control by Non-Ionic Polymers: Influence of Water System Impurities. Int. J. Corros. Scale Inhib. 5, (2016), 100-111.

Bergna, H. E. and Roberts, W. O.: Colloidal Silica: Fundamentals and Applications. Taylor & Francis, New York, (2006).

Chen, S.; Brown, K. and Jermy, M.: An explanation for the Unexpected Interactions of Silica Nanoparticles Using the Soft Particle Model, Proceedings 40th New Zealand Geothermal Workshop, Taupo, New Zealand (2018).

Demadis, K. D. and Neofotistou, E.: Synergistics Effects of Combinations of Cationic Polyaminoamide Dendrimers/Anionic Polyelectrolytes on Amorphous Silica Formation: A Bioinspired Approach. Chem. Mater. 19, (2007), 581-587.

Demadis, K. D.; Pachis, K.; Ketsetzi, A. and Stathoulopoulou, A.: Bioinspired Control of Colloidal Silica In Vitro by Dual Polymeric Assemblies of Zwitterionic Phosphomethylated Chitosan and Polycations or Polyanions. Adv. Coll. Interfac. Sci. 151, (2009), 33-48.

Gallup, D. L.: The Use of Reducing Agents for Control of Ferric Silicate Scale Deposition, Geothermics, 22, (1993), 39-48.

Gallup, D. L.: Aluminum Sicitate Scale Formation and Inhibition: Scale Characterization and Laboratory Experiments, Geothermics, 26, (1997), 483-499.

Gallup, D. L.: Investigations of Organic Inhibitors for Silica Scale Control from Geothermal Brines, Geothermics, 31, (2002), 415-430.

Gallup, D. L. and Barcelon, E.: Investigations of Organic Inhibitors for Silica Scale Control from Geothermal Brines-II, Geothermics, 34, (2005), 756-771.

Garcia, S. E. and Mejorada, A. V. Geogard S. X.: A Silica Scale Inhibitor for Geothermal Brine, GRC Trans, 25, (2001), 15-21.

Gonzalez, W. J.; Kellogg, N. L.; Reyers Briseno, E.; Garibaldi, F. and Mora, O.: Evaluation of Various Organic Inhibitors in Controlling Silica Fouling at the CFE Cerro Prieto Geothermal Field. GRC Annual Meeting, Morelia, Mexico (2003).

Iler, R. K.: Coagulation of Colloidal Silica by Calcium Ions, Mechanism, and Effect of Particle Size, J. Coll. Interfac. Sci. 53, (1975), 476-488.

Inanli, M. and Atilla, V.: Metal Silicate Formation at Tuzla Geothermal Brine Lines, Proceedings International Workshop on Mineral Scaling, Manilla, Philippines (2011).

Johnston, J. H.; Borrmann, T.; Schweig, M. and Cairns, M. J.: Elimination of the Problematic Deposition of Silica from Separated Geothermal Brine, Proceedings 40th New Zealand Geothermal Workshop, Taupo, New Zealand (2018).

Mavredaki, E.; Neofotistou, E. and Demadis, K. D.: Inhibition and Dissolution as Dual Mitigation Approaches for Colloidal Silica Fouling and Deposition in Process Water Systems: Functional Synergies, Ind. Eng. Chem. Res., 44, (2005), 7019-7026.

Newton, C. J.; Zarrouk, S. J.; Lawless, J.; Rowe, M. C.; Guidos, J. A. and Brown, K. L.: Aluminium-Rich Silica Scaling: San Jacinto-Tizate Geothermal Energy Project, Nicaragua, Proceedings 40th New Zealand Geothermal Workshop, Taupo, New Zealand (2018).

Ngothai, Y.; Lane, D.; Kuncoro, G.; Yanagisawa, N.; Rose, P. and Pring, A.: Effect of Geothermal Brine Properties on Silica Scaling in Enhanced Geothermal Systems, GRC Trans, 36, (2012), 871-880.

Nishida, I.; Shimada, Y.; Saito, T.; Okaue, Y. and Yokoyama, T.: Effect of Aluminum on the Deposition of Silica Scales in Cooling Water Systems, J. Coll. Interfac. Sci. 335, (2009), 18-23.

Weres, O.; Yee, A. and Tsao, L.: Kinetics of Silica Polymerization, J Coll. Interfac. Sci., 84, (1981), 379-402.

Zhang, B.; Chen, Y. and Li, F.: Inhibitory Effects of Poly (adipicacid/amine-Terminated Polyether D230/Diethylenetriamine) on Colloidal Silica Formation. Coll. Surf. A: Phisiochem. Eng. Aspects, 385, (2011), 11-19.

Zhang, B.; Sun, P; Chen, F. and Li, F.: Synergistic Inhibition Effect of Polyaminoamide Dendrimers and Polyepoxysuccinic Acid on Silica Polymerization, Coll. Surf. A: Physicochem. Eng. Aspects, 410, (2012), 159-169

Zhang, B.; Xin, S.; Chen, Y. and Li, F.: Synergistic Effect of Polycation and Polyanion on Silica Polymerization, J. Coll. Interfac. Sci., 368, (2012), 181-190.

Zuhl, R. W. and Amjad, Z.: In Mineral Scales in Biological and Industrial Systems. Amjad, Z. Ed.; CRC Press, Boca Raton, FL, (2014), p. 173-199.

Deo, P.; Simon, M; Akhade, P.; Abramo, G. P.; Young, Kaylie; Mehta, S. C. Inhibition of Silica Scale using a Chelating Agent Blended with Acid and Alkylene Oxide Derived Polymer Dispersants. WO 2019/232019 A1. May 29, 2019.

Gallup, D. L. Inhibition of Silicate Scale Control. U.S. Pat. No. 5,858,245. Jan. 12, 1999.

Hendel, R. A.; Yan, L.; Cheng, L. Methods for Controlling Silica Scale in Aqueous Systems. U.S. Pat. No. 7,316,787 B2, Jan. 8, 2008.

Dubin, L. Silica inhibition: Prevention os Silica Deposition by Addition of Low Molecular Weight Organic Compounds. U.S. Pat. No. 4,532,047. Jul. 30, 1985.

Nishida, I. Inhibitor and method for Preventing Silica-Based Scale. U.S. Pat. No. 8,927,654 B2. Jan. 6, 2015.

Topcu, G.; Celik, A.; Kandemir, A.; Baba, A.; Sahin, H.; Demir, M. M. Increasing Solubility of Metal Silicates by Mixed Polymeric Antiscalants, Geothermics, 77, (2019), 160-114.

Hirsh, K. A.; Thankachan, C. Method for Inhibiting the Deposition of Silica and/or Silicate Compounds in Aqueous Systems. U.S. Patent Application 2001/0049052 A1. Mar. 3, 2011.

Amjad, Z.; Zuhl, R. W. Preventing Silica and Silicate Scale with Inhibitors in Industrial Water Systems. U.S. Patent Application 2011/0114564 A1. May 19, 2011.

Mehta, S. C.; DuFour, A. Inhibition of Silica Scale Using Amine-Terminated Polyoxyalkylene. U.S. Pat. No. 10,118,848 B2. Nov. 6, 2018.

Mehta, S.; Turini, B. L. Synergistis Silica Scale Control. U.S. Patent Application 2015/0076074 A1. Mar. 19, 2015.

Buentello, K. E.; Kessler, S. M.; May, R. C.; Kaechelin, J. A.; Chen, F.; Kolson, N. A. Method for Controlling Scale Formation and Deposition in Aqueous Systems. U.S. Pat. No. 6,641,754 B2. Nov. 4, 2003.

Brown, M. J.; McDaniel, C. R.; Nguyen, T. K.; Sherwood, S. P. Method for Controlling Silica Deposition in Aqueous Systems. U.S. Pat. No. 5,100,558. Mar. 31, 1992.

Roe, D. C. Inhibitino of Silica and Silicate Depostion Using Ethylene Oxide-Propylene Oxide Block Copolymers.

Preari, M.; Spinde, K.; Lazic, J.; Brunner, E.; Demadis, K. D. Bioinspired Insights into Silicic Acid Stabilization Mechanisms: The Dominant Role of Polyethylene Glycol-Induced Hydrogen Bonding. J. Am. Chem. Soc. 136, (2014), 4236-4244.

Demadis, K. D.; Preari, M. "Green" Scale Inhibitors in Water Treatment Processes: the Case of Silica Inhibition. Desalination and Water Treatment. 55, (2015), 749-755.

What is claimed is:

1. A method of inhibiting the formation of silica scale in a geothermal system, comprising treating the water in the geothermal system with an anti-scalant effective amount of a combination of two inhibitors comprising a first inhibitor and a second inhibitor, wherein the first inhibitor comprises polyethylene glycol having a minimum molecular weight of 2000 g/mol and wherein the second inhibitor comprises EDTA or pentetic acid.

2. The method according to claim 1, wherein the second inhibitor comprises EDTA.

3. The method according to claim 2, wherein a combination of two inhibitors has a polyethylene glycol to EDTA weight ratio of 1:2.

4. The method according to claim 1, wherein the first inhibitor comprises PEG 9000.

5. The method according to claim 1, wherein treating the water comprises forming treated water, and wherein a concentration of the first inhibitor in the treated water is from about 0.1 ppm to about 100 ppm, and a concentration of the second inhibitor in the treated water is from about 0.1 ppm to about 100 ppm.

6. The method according to claim 1, wherein the pH is 7 to 8.

7. The method according to claim 1, wherein the first inhibitor has a weight average molecular weight of 3800 to 20000 Dalton.

8. The method according to claim 1, wherein the second inhibitor is pentetic acid.

9. The method according to claim 1, wherein the water in the geothermal system comprises 20 ppm to 1000 ppm silica as $SiO_2$.

10. The method according to claim 1, wherein the polyethylene glycol has a weight average molecular weight of at least 4000 Dalton.

11. The method according to claim 1, wherein the polyethylene glycol has a weight average molecular weight of at least 5000 Dalton.

12. A method of inhibiting the formation of silica scale in the water of a geothermal system, comprising treating the water of the geothermal system with an anti-scalant effective amount of a combination of two inhibitors consisting of a first inhibitor and a second inhibitor, wherein the first inhibitor comprises a polyethylene glycol having a molecular weight of at least 2000 g/mol and the second inhibitor comprises EDTA, pentetic acid, or salts thereof.

13. The method according to claim 12, wherein the water in the geothermal system comprises 1 ppm or more of $Al^{3+}$.

14. The method according to claim 12, wherein the water in the geothermal system comprises 20 ppm to 1000 ppm silica as $SiO_2$.

15. The method according to claim 12, wherein the first inhibitor comprises polyethylene glycol with a number average molecular weight of at least 3800 g/mol.

16. The method according to claim 12, wherein the first inhibitor comprises polyethylene glycol with a number average molecular weight of at least 4000 g/mol.

17. An aqueous composition stabilized against silica polymerization and flocculation comprising water and silica, and further comprising stabilizing amounts of a first inhibitor comprising a polyethylene glycol having a molecular weight of at least 4000 g/mol and of a second inhibitor comprising EDTA or pentetic acid.

18. The aqueous composition according to claim 17, further comprising 1 ppm or more of $Al^{+3}$.

19. The composition according to claim 18, comprising 0.1 to 100 pm of the polyethylene glycol and 0.1 to 100 ppm of EDTA.

20. The composition according to claim 17, comprising 200 ppm to 1000 ppm of $SiO_2$.

* * * * *